No. 655,286. Patented Aug. 7, 1900.
J. E. VAN NEST.
VEHICLE TIRE.
(Application filed Dec. 14, 1899.)

(No Model.)

Witnesses
C. H. Walker
Geo. H. Chandlee

J. E. Van Nest Inventor
By his Attorneys,
C. A. Snow & Co.

UNITED STATES PATENT OFFICE.

JAMES EUGENE VAN NEST, OF MARTINSVILLE, NEW JERSEY.

VEHICLE-TIRE.

SPECIFICATION forming part of Letters Patent No. 655,286, dated August 7, 1900.

Application filed December 14, 1899. Serial No. 740,342. (No model.)

*To all whom it may concern:*

Be it known that I, JAMES EUGENE VAN NEST, a citizen of the United States, residing at Martinsville, in the county of Somerset and State of New Jersey, have invented a new and useful Vehicle-Tire, of which the following is a specification.

This invention relates to vehicle-tires; and it has for its object to provide a tire which will be elastic and resilient and which will be durable and unaffected by those conditions which usually destroy the utility of the so-called "pneumatic tire."

The tire consists of two circular hoops of metal, one of which is concaved upon its outer periphery and the other is convexed upon its inner periphery, each hoop being semicircular in cross-section and connected at their edges continuously by means of hinges to form a tubular tire. Within the tire and at different points thereof are arranged bow-springs, which tend to hold the tire circular in cross-section and which stiffen the structure and aid the elasticity thereof.

Figure 1:
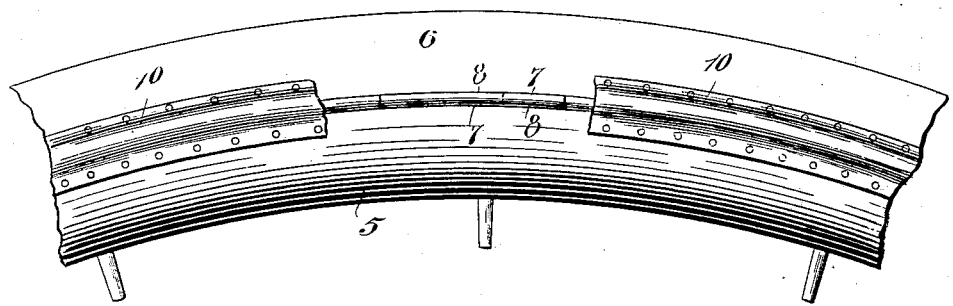
Figure 2:
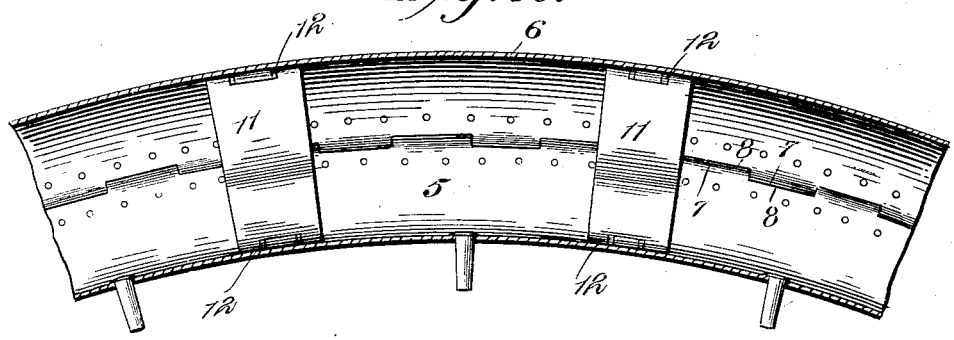
Figure 3:
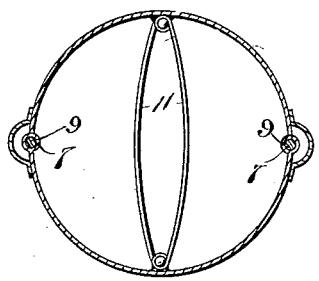

In the drawings forming a part of this specification and in which like parts are indicated by the same numerals, Figure 1 is a side elevation of a portion of a tire constructed in accordance with this invention and in which a part of the sealing-strip is broken away to show the hinged joint. Fig. 2 is a longitudinal central section of Fig. 1, with the spring-plates in elevation. Fig. 3 is a transverse section of Fig. 1.

Referring now to the drawings, the tire consists of an inner element 5 and an outer element 6, both of which are semicircular in cross-section. The element 5 is concaved in its outer periphery, while the outer periphery of the element 6 is convex, these elements having diameters and being disposed with their edges in mutual contact and having registering ears 7 and intermediate interspaces 8, the ears being bent to form hinge elements mutually connected through the medium of a single hinge-pin 9 at each side.

The elements 5 and 6 of the tire are formed of spring-steel or other spring metal, and under pressure the tendency is for their points of greatest separation to move toward each other, at which time their edges move outwardly, this operation being permitted by the hinge-joints. If desired, ingress of dust and other foreign matter to the inclosure of the tire may be prevented by securing circular bands 10, of rubber or other flexible material, over the hinged joints, the edges of these bands being riveted or otherwise secured to the elements 5 and 6.

Under ordinary conditions of use the elements 5 and 6 possess sufficient elasticity and durability to withstand the pressure applied thereto; but where excessive loads are carried it has been found desirable to reinforce the tire by disposing at different points therein spring-plates 11, arranged in pairs and having their ends hingedly connected with each other and with ears 12 upon the inner surfaces of the elements 5 and 6. These spring-plates 11 are bowed outwardly, and being disposed radially of the completed tire they receive a part of the strain or pressure at the tread of the tire and distribute it to the felly, and at the same time they act to return the tire to its normal shape.

It will of course be understood that, if desired, the protecting-bands 10 may be omitted, as also the plates 11, and that any desired material and proportions may be employed without departing from the spirit of the invention. Furthermore, the hinge-protecting band 10 may be made integral with the outer piece 6 and in the form of a flap, which may lie upon the inner portion 5 or may lie between it and the second flap formed integral therewith and adjacent the edge.

Having thus described the invention, what is claimed as new is—

1. A bicycle-tire comprising a spring-metal hoop which is arc-shaped in cross-section and concaved in its outer periphery, a second spring-metal hoop which is arc-shaped in cross-section and is concaved in its inner periphery, hinge connections between the edges of the hoops, and a flexible covering for each hinge connection.

2. A vehicle-tire comprising a spring-metal hoop, a second spring-metal hoop hingedly connected with the first-named hoop to form a tubular tire, and reinforcing spring-plates hingedly connected in pairs and disposed radially of the tire.

3. A vehicle-tire comprising two spring-metal hoops, arc-shaped in cross-section and having their edges hingedly connected to form a tubular tire, coverings for the hinged connections, and spring-plates hingedly connected in pairs and disposed radially of the tire and engaging opposite points of the inner periphery thereof.

In testimony that I claim the foregoing as my own I have hereto affixed my signature in the presence of two witnesses.

JAMES EUGENE VAN NEST.

Witnesses:
WILLIAM CORIELL,
ALICE M. THOMPSON.